W. T. SEARS.
CAR WHEEL BORING MACHINE.
APPLICATION FILED AUG. 6, 1920.

1,422,140.  Patented July 11, 1922.
4 SHEETS—SHEET 1.

Inventor
Willard T. Sears
By S. Jay Teller
Attorney

W. T. SEARS.
CAR WHEEL BORING MACHINE.
APPLICATION FILED AUG. 6, 1920.

1,422,140.

Patented July 11, 1922.
4 SHEETS—SHEET 2.

Inventor
Willard T. Sears,
By S. Jay Teller
Attorney

W. T. SEARS.
CAR WHEEL BORING MACHINE.
APPLICATION FILED AUG. 6, 1920.

1,422,140.

Patented July 11, 1922.
4 SHEETS—SHEET 3.

Inventor
Willard T. Sears
By S. Jay Teller
Attorney

UNITED STATES PATENT OFFICE.

WILLARD T. SEARS, OF MONTCLAIR, NEW JERSEY, ASSIGNOR TO NILES-BEMENT-POND COMPANY, OF NEW YORK, N. Y., A CORPORATION OF NEW JERSEY.

CAR-WHEEL-BORING MACHINE.

1,422,140.

Specification of Letters Patent. Patented July 11, 1922.

Application filed August 6, 1920. Serial No. 401,719.

*To all whom it may concern:*

Be it known that I, WILLARD T. SEARS, a citizen of the United States, residing at Montclair, in the county of Essex and State of New Jersey, have invented certain new and useful Improvements in Car-Wheel-Boring Machines, of which the following is a specification.

This invention relates to metal working machines and particularly to a machine for boring out the hubs of car wheels. In the usual type of machine used for this work, the boring bar is vertically arranged and held stationary while the work is rotated with its central axis in alignment with the boring bar. The type of machine comprising the present invention preferably comprises a construction wherein the tool rotates and the work is held stationary, the axis of rotation of the tool and the central axis of the work being approximately horizontal.

It is the general object of this invention to provide an improved machine of the type above described, other objects of the invention being the provision of an improved work-holding turret whereby the chucking of a new piece of work may take place at one station while boring is taking place at another station, improved means for feeding the tool to and from the work, means within the work holder for supporting the free end of the boring bar during the boring operation, a more rigid combined construction by providing means to securely bind the work and tool supports together, and also in some instances a crane mounted above the work holder for lifting the work into position in the chuck. Other and more specific objects of the invention will become apparent as the description proceeds.

Referring to the figures of the drawings.

In a boring machine, the boring bar is necessarily fed forward in the cutting operation very slowly and may be very rapidly returned to initial position ready for another cutting operation. With the type of such machine in ordinary use, the machine must then be idle while the operator is removing the finished piece of work and mounting a new piece on the work support. As illustrated in the drawings, one feature of the invention is the provision of a turret work holder having at least two chucks thereon, one chuck being in position to receive a new piece of work while the other chuck is in the boring position. The work support is also very rigidly secured to the rest of the machine by a rail spanning the tops of the work and tool supports, and in certain forms of the invention it may be desirable to mount a work-lifting crane on the machine, substantially as illustrated. A very substantial feeding mechanism for the tools has also been provided, such mechanism being hereinafter described. While the invention is illustrated as embodying certain forms as shown in the drawings, it is to be understood that such mechanism is merely illustrative and may be varied within the scope of the appended claims.

Figure 1:
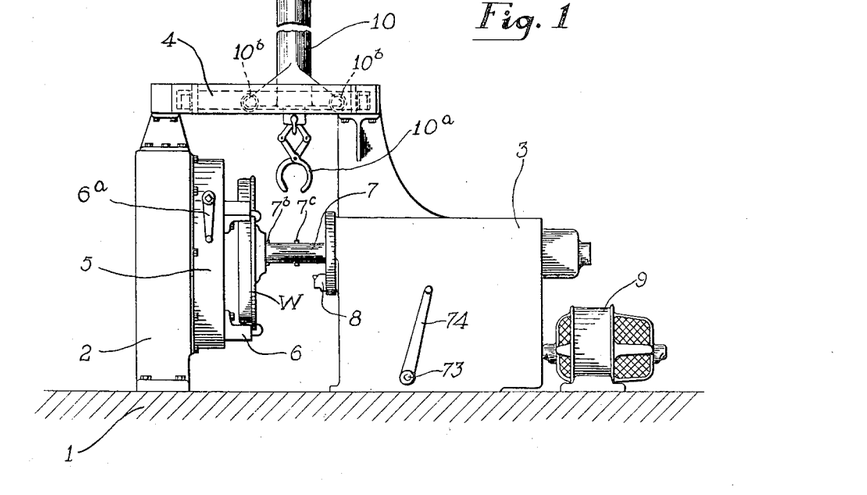
Figure 1 is a side elevation of one form of machine embodying the present invention.
Figure 5:
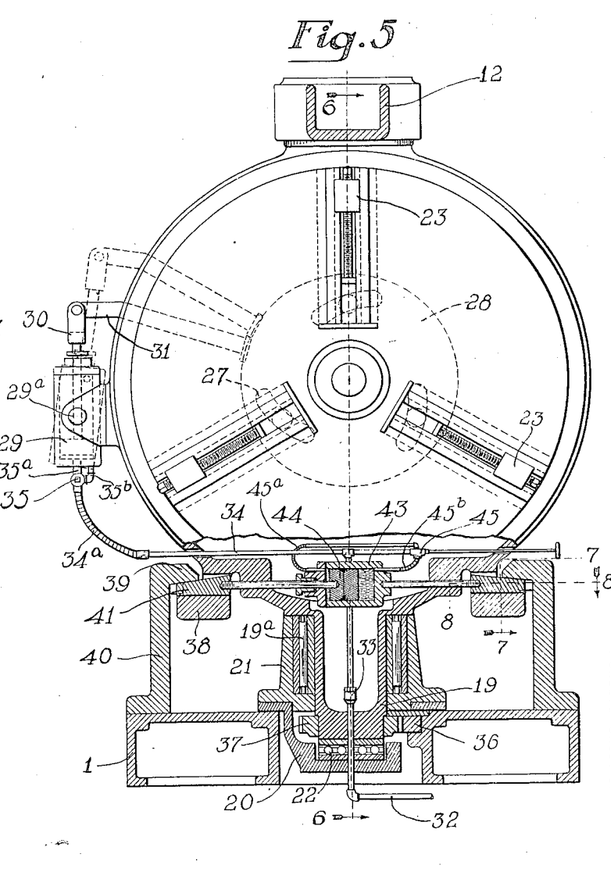
Fig. 5 is an end elevation of a turret work holder similar to that shown in Fig. 2, the base thereof being shown in vertical section.

Referring to the drawings by reference characters, and particularly to Fig. 1, 1 represents the base of a boring machine having mounted thereon a work support 2 and a tool support 3. These supports are secured rigidly to the base of the machine and a rail 4 bolted to the top of the supports rigidly binds the supports together as a unit. The work support shown in Fig. 1 has mounted thereon a chuck 5 provided with a plurality of clamping jaws 6 adapted to grip the work W. The jaw operating mechanism of the chuck is of the type adapted to center and securely hold the work thereon, it being sufficient here to state that the jaws are moved radially into and out of engagement with the work by means of a crank $6^a$, this mechanism being more fully illustrated in Figs. 9 and 10 hereinafter described. The operation of the jaws is similar to that shown in Fig. 5, also hereinafter described. The boring bar 7 and preferably a facing tool 8 are mounted for rotation and feeding movement in the tool support, the motor 9 being adapted to rotate these members, and other mechanism hereinafter described being adapted to perform the feeding operations. In certain types of this machine, it is preferred to mount a work-lifting crane 10 above the work support, preferably for traveling movement on the rail 4, such crane being provided with work-engaging jaws $10^a$ and anti-friction rollers $10^b$ adapting the crane to travel along the rail 4. As illustrated, the crane is preferably of the fluid operated type.

Figure 2:
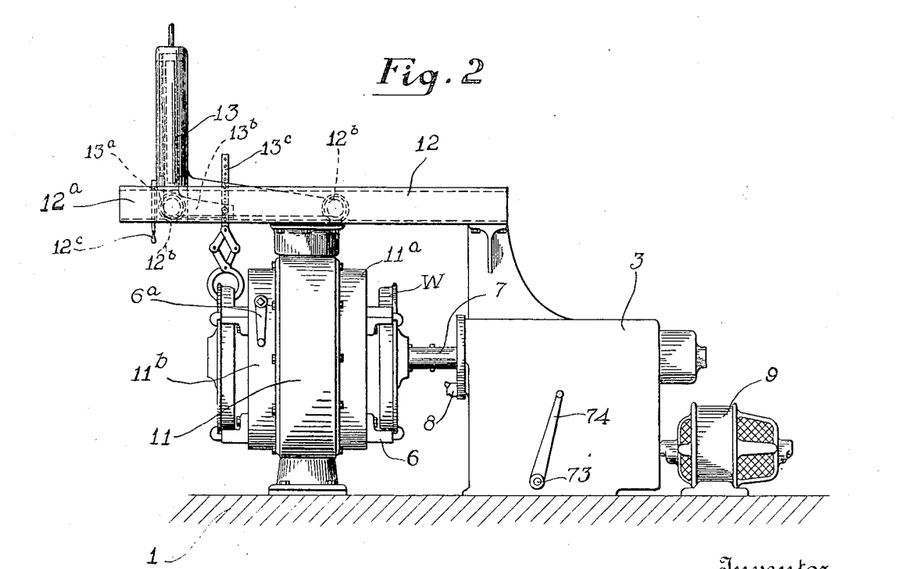
Fig. 2 is a like view of another form of the invention.

In Fig. 2 there is illustrated a modified form of work support comprising a turret 11 having two chucks $11^a$ and $11^b$ thereon, the turret being adapted for swivelling movement about a vertical axis. The rail 12 in this form of the machine extends across the tool and work supports and extends beyond the work support at $12^a$ to provide a support for rollers $12^b$ of the traveling crane 13. The crane is controlled from an operating handle $12^c$. With the chucks in the relative position illustrated, it will be seen that while one chuck $11^a$ is in a position for operation by the tools the other chuck $11^b$ is in the work-chucking position. The crane 13 is similar to that illustrated in Fig. 1, the work-lifting piston $13^a$ however being provided at its lower end with a horizontally extending arm $13^b$ and the shank $13^c$ of the work-engaging jaws being provided with a plurality of holes therein permitting vertical adjustment of the jaws on the arm. In the work-lifting operation the piston $13^a$ is moved to its extreme upper position and therefore the adjustment at $13^c$ must be set in different positions to bring different sized pieces of work into the proper chucking positions. The arm $13^b$ serves to bring the work load to a position between the rollers $12^b$.

Figure 3:
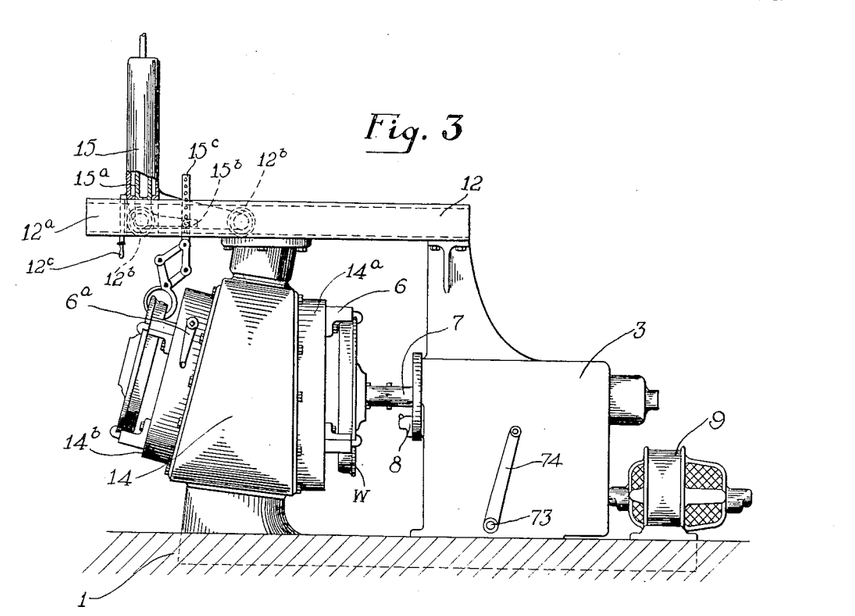
Fig. 3 is a similar view of another form of the invention.

In Fig. 3 is illustrated a construction similar to that of Fig. 2, the turret work support 14 however being mounted to swivel about an axis slightly inclined to the vertical. By this arrangement it will be seen that the chuck $14^a$ adjacent the tool support is in a position with its axis horizontal and coincident with the axis of the boring bar 7 and that the other chuck $14^b$ is in the work-chucking position removed from the tool support and with its axis slightly inclined to the horizontal. Either chuck when in the position illustrated at $14^a$ is in its exact tooling position and when in the position illustrated at $14^b$ the chuck is slightly inclined backward whereby chucking may be performed with considerably more ease than with the chuck in the vertical position. This type of machine is illustrated as provided with a crane 15 substantially like the crane 13 illustrated in Fig. 2, the parts $15^a$, $15^b$ and $15^c$ being substantially those shown at $13^a$, $13^b$ and $13^c$ respectively.

Figure 4:
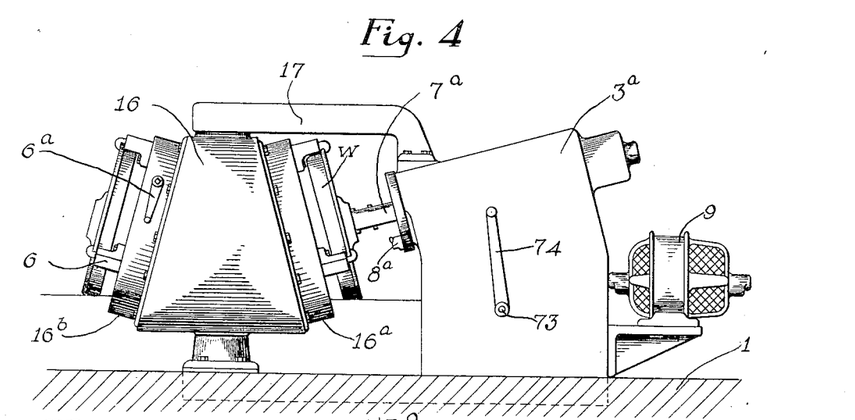
Fig. 4 is a similar view of another form of the invention.

In Fig. 4 is illustrated another form of the invention wherein the turret 16 is adapted to swivel about a vertical axis and both chucks $16^a$ and $16^b$ are slightly inclined backward in all positions. Since the boring bar must be coincident with the axis of the hub of the wheel to be bored and with the chuck axis, the boring bar $7^a$ is illustrated as mounted at an angle to the horizontal in its support $3^a$, the facing tool $8^a$ being mounted in the same position relative the the bar $7^a$. The crane has not been illustrated in this form of the invention since, with the chuck in the inclined position, a car wheel may quite easily be rolled into place in the chuck. The work and tool supports are however secured rigidly together by means of the rail or tie bar 17.

In Figs. 5 to 8, there is illustrated a mechanism for operating the work-holding jaws, the swivel support for the turret and means for securing the turret in the working position. While such mechanism has been shown in connection with a work holder similar to that illustrated in Fig. 2, it should be understood that this mechanism may be applied equally as well to the other forms of turret work holders illustrated. The work holder is provided at its upper and lower sides with trunnions 18 and 19 mounted respectively in the rail 12 and the base 1, roller bearings $18^a$ and $19^a$ being interposed to provide easy rotative movement of the holder. A supporting cup 20 is mounted in an opening in the base 1 and has mounted thereon a second member 21 surrounding the trunnion 19. A ball race 22 between the trunnion 19 and the cup 20 supports the weight of the work holder for easy rotative movement. While the work may be secured in the chuck and the work holder may be secured in operative position by any desired means, it is preferred to illustrate these operations herein as being performed by fluid pressure means.

The clamping jaws 23 of each chuck are mounted on radial slides 24 and are adapted to be adjusted in such slides radially of the chuck to allow for work of different diameters by means of screws 25. The slides 24 each have a roller 26 mounted on a screw threaded into the slide, each roller engaging in a cam slot 27 in a disk 28. It will be seen that rotation of the disk in one direction moves the slides and jaws inward to clamp the work and rotation of the disk in the other direction moves the slides and jaws outward to disengage the work. For operating each disk there is illustrated a fluid pressure cylinder 29 pivoted at 29$^a$ and provided with a piston and a piston rod 30 engaging an arm 31 secured to the disk, the mechanism being shown in the disengaged position by the full lines and in the engaged position by the dotted lines in Fig. 5. The fluid pressure to the cylinder is obtained through the main supply pipe 32 extending centrally through the trunnion 19, a swivel joint being provided at 33 to allow the work holder and the pipe connections thereof to rotate on the main pipe 32. The branch pipe 34 and flexible connection 34$^a$ thereof convey the fluid to the cylinder, the fluid flow through the pipes 35$^a$ and 35$^b$ to the opposite ends of the cylinder being controlled by the two-way valve 35.

Figures 6, 7, 8:
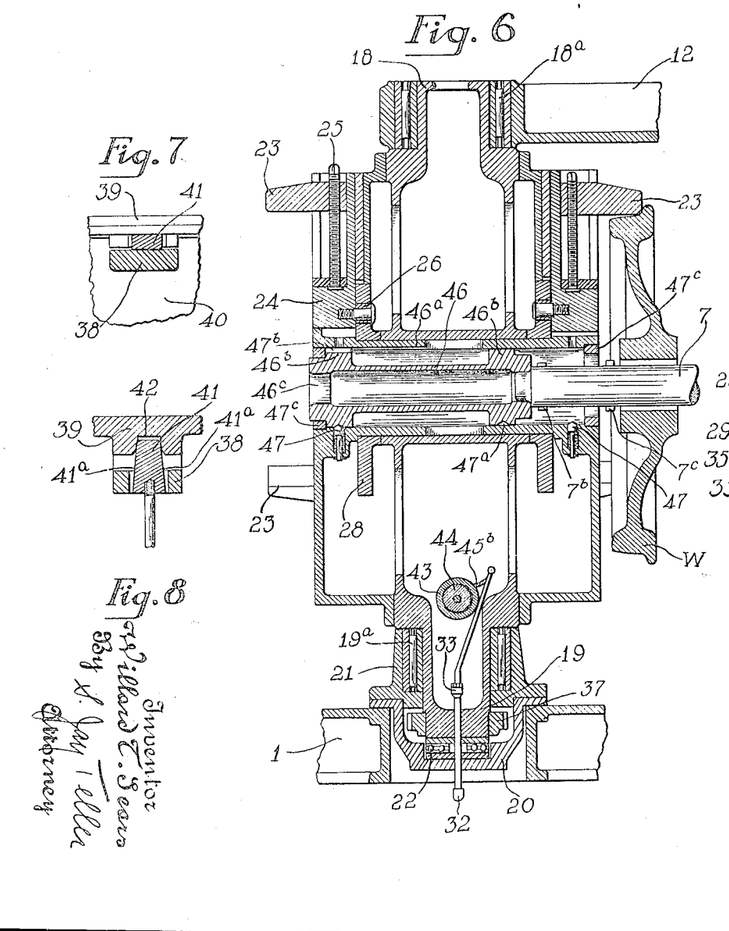
Fig. 6 is a vertical section of the work holder taken on the line 6—6 of Fig. 5.
Figs. 7 and 8 are detail fragmentary sectional views of the turret-securing mechanism, such views being taken on lines 7—7 and 8—8 respectively of Fig. 5.

When using the two chuck turret work holder, the turret must be rotated through 180° each time a new piece of work is presented to the boring tool and it is essential that the central hub axis of the wheel to be bored shall exactly align with the boring bar and be held in such position during the boring operation. The turret may be rotated by hand or other means, as, for instance, a rack 36 engaging a pinion 37 secured to the trunnion 19, the rack being operated by any suitable means. The turret is provided with U-shaped projections 38 extending beneath projections 39 on the upstanding portion 40 of the base 1. A wedge 41 slidably mounted in each projection 38 is adapted to engage under each projection 39. As illustrated in Figs. 7 and 8, the wedge is laterally tapered at 41$^a$ and adapted to enter a like shaped opening 42 in the projection 39. The wedges are operated by fluid pressure means as illustrated, one wedge being secured to the cylinder 43 and the other wedge to the piston 44 within the cylinder. Fluid pressure is conveyed to the opposite ends of the cylinder by means of the flexible connections 45$^a$ and 45$^b$, a two-way valve 45 serving to control the flow of fluid thereto. The turret is turned to approximately the working position and the outward movement of the wedges through the tapered engaging surfaces 41$^a$ will first bring the turret into exact working position to align the boring bar and central axis of the car wheel to be bored and will thereafter serve to securely hold the same in such position.

In Fig. 6, I have illustrated means located centrally of the work-holding chucks for supporting the free end of the boring bar in a central position during the boring operation. This means preferably comprises a centering member 46 having a sliding fit within a central opening 46$^a$ of the turret and in axial alignment with both work-holding chucks. As illustrated, each end of the member 46 is supported by a flange 46$^b$ and is provided with an opening 46$^c$ therein adapted to receive and support the free end of the boring bar 7. A spring pressed latch 47 at each end of the member 46 is adapted to seat within a notch 47$^a$ to normally hold the member 46 in position at one or the other end of its sliding movement and a key 47$^b$ prevents the rotation of such member. In the usual operation of the machine, it is not essential that the free end of the boring bar be supported during the cutting operation of the roughing tool 7$^b$. However, as the roughing tool is finishing its cut and just prior to the beginning of the cut of the finishing tool 7$^c$, the free end of the bar is adapted to enter the adjacent opening 46$^c$ in the member 46 whereby the end is supported during the operation of the finishing tool, the member 46 sliding along longitudinally with the feed of the boring bar. By adapting the member 46 to slide along with the feeding movement of the bar 7, the supporting end portion of the bar, fitting within the opening 46$^c$, may be made very short. Were the member 46 made stationary, it would be necessary to make such supporting portion of the bar of a length at least equal to the feeding distance of the finishing cutter. A stop collar 47$^c$ within each end of the opening 46$^a$ of the turret limits the sliding movement of the member 46. The feeding movement of the bar forces the member 46 to a position adjacent the face of and ready for operation in the opposite chuck and the latch 47 holds the member in such position while the boring bar is being withdrawn.

Figures 9, 10:
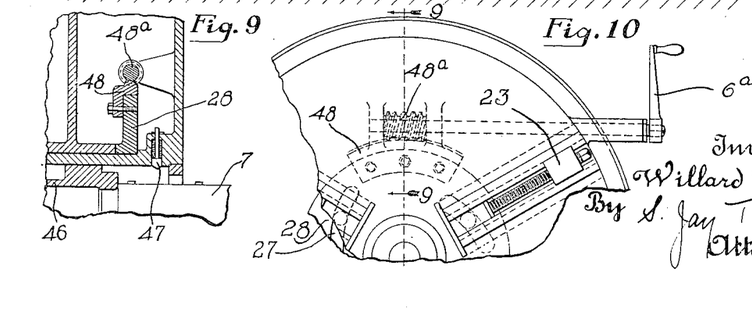
Figs. 9 and 10 are fragmentary detail views illustrating a slightly different mechanism from that shown in Figs. 5 and 6 for operating the work-holding jaws, Fig. 9 being taken on line 9—9 of Fig. 10.

In Figs. 9 and 10, I have illustrated in detail the mechanism for operating the work-holding jaws from the crank 6$^a$ shown in Figs. 1 to 4. This mechanism is substantially that shown in Figs. 5 and 6 except that each disk 28 has a worm wheel sector 48 secured thereto which sector is operatively engaged by a worm 48$^a$ on the same shaft with the crank 6$^a$. The rotation of the crank 6$^a$ in one direction or the other moves the disk 28 in opposite directions respectively and serves to clamp or unclamp the work-holding jaws from the work.

Figures 11, 12, 13, 14:
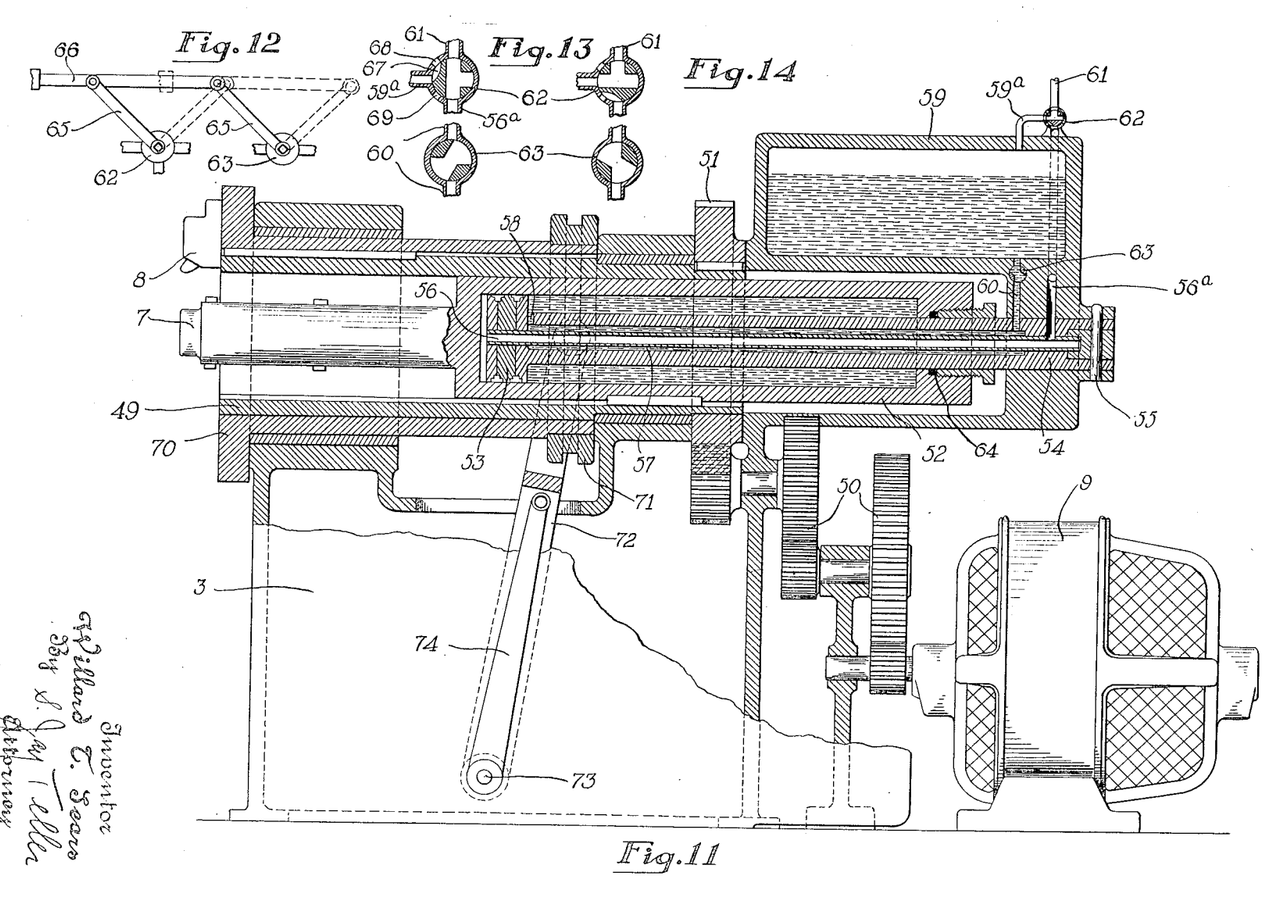
Fig. 11 is a vertical longitudinal section through the mechanism for operating the boring bar and facing tool.
Fig. 12 is a detail view showing a means for operating the two controlling valves simultaneously.
Fig. 13 is a detail view illustrating the two controlling valves in the boring bar feeding position.
Fig. 14 is a similar view showing the valves in the boring bar withdrawing position.

In Fig. 11, I have illustrated a mechanism for rotating and feeding the tools relative to the work. Rotatably mounted within the main tool support 3 is a tool supporting sleeve 49 adapted to be driven from the motor 9 by a train of gearing 50 to a gear 51 keyed to the sleeve 49. The boring bar 7 comprises a cylindrical body portion 52 slidably splined within the rotary sleeve 49. A piston 53 within the cylinder 52 is rigidly secured to the frame of the machine by means of the piston rod 54 and pin 55. This piston rod is hollow and a pipe therein passing entirely through the piston affords a port 56 communicating with the cylinder in front of the piston and the space around such pipe affords a port 57 to the other side of the piston through the orifice 58. Mounted on the main frame, preferably integral therewith as illustrated, is an oil reservoir 59. A conduit 60 affords a communication between the bottom of the reservoir and the port 57 and an air pipe 61 is adapted by means of the valve 62 and pipes 56$^a$ and 59$^a$ to be placed in communication with either the port 56 or the reservoir respectively. A valve 63 in the conduit 60 serves to regulate the flow of fluid as will be hereinafter described. A packing gland between the cylinder and piston rod is illustrated at 64.

Figs. 12, 13 and 14 illustrate in detail the construction and operation of the controlling valves 62 and 63. The two valves are adapted to be operated simultaneously through an angle of 90° by means of arms 65 and connecting rod 66. In Fig. 13, the valves are shown in a position to feed the boring bar slowly forward in the cutting operation. The air pipe 61 is in communication with the port 56 and the valve 63 is in a position leaving only a restricted opening therethrough. The air passing through the port 56 and into the cylinder 52 at the front side of the piston moves the cylinder and boring bar forward, such movement however being very slow since the oil in the port 57 must pass through the restricted opening of the valve 63 into the reservoir. When the boring operation is completed and it is desired to return the boring bar to its original position, the valves are turned 90° to the position illustrated in Fig. 14. The air pipe 61 is now in communication with the reservoir and the valve 63 is wide open. The air pressure from the pipe 61 to the reservoir now rapidly forces the oil through the conduit 60 and valve 63 into the port 57 and the cylinder 52 behind the piston 53. The cylinder is thereby rapidly returned to its initial position. The valve 62 is slightly cut away at 67 whereby communication with the exhaust ports 68 and 69 is provided.

I also mount a facing tool 8 preferably on the outside of the rotary sleeve 49. The support for this tool comprises a sleeve 70 splined to the sleeve 49. A collar 71 on the sleeve 70 is engaged by the forks of an arm 72 mounted on a rock shaft 73. An operating handle 74 on such shaft provides a means for manually moving the facing tool to and from the work.

What I claim is:

1. In a boring machine, the combination of a base, a substantially vertically extending work holder thereon comprising a chuck, a tool support also mounted on the base, a tool mounted in the tool support, means extending across the tops of the work holder and tool support and rigidly connecting such members, and means for causing relative rotating and feeding movements between the tool and chuck.

2. In a boring machine, the combination of a base, a substantially vertically extending work holder thereon comprising a chuck, a tool support also mounted on the base, a rail extending across the tops of the work holder and tool support and rigidly connecting such members, a boring bar mounted in the tool support coaxially of the chuck, and means for causing relative rotating and feeding movements between the bar and chuck.

3. In a boring machine, the combination of a base, a work-holding turret comprising two chucks swivelly mounted on the base on an axis relatively angular to the longitudinal axes of the chucks, a tool support also mounted on the base, means rigidly connecting the turret and tool support, a boring bar mounted in the tool support, and means for causing relative rotating and feeding movements between the bar and turret.

4. In a boring machine, the combination of a base, a work-holding turret comprising two chucks mounted on the base for movement about an approximately vertical axis whereby one chuck may be placed in the tooling position and the other chuck in the work-chucking position, a tool support also mounted on the base, means rigidly connecting the turret and tool support, a boring bar mounted in the tool support coaxially of the chuck in the tooling position, and means for causing relative rotating and feeding movements between the bar and last mentioned chuck.

5. In a boring machine, the combination of a base, a work-holding turret comprising two chucks mounted on the base for movement about an approximately vertical axis whereby one chuck may be placed in the tooling position and the other chuck in the work-chucking position, a tool support also mounted on the base, a boring bar mounted in the tool support coaxially of the chuck in the tooling position, a rail extending across the tops of the turret and tool support and rigidly connecting such members, and means for causing relative rotating and feeding movements between the bar and last mentioned chuck.

6. In a boring machine, the combination of a base, a work-holding turret comprising two chucks mounted on the base for movement about an approximately vertical axis whereby one chuck may be placed in the tooling position and the other chuck in the work-chucking position, the axis of the chuck in the work-chucking position being slightly inclined to the horizontal, a tool support also mounted on the base, a boring bar mounted in the tool support coaxially of the chuck in the tooling position, and means for causing relative rotating and feeding movements between the bar and last mentioned chuck.

7. In a boring machine, the combination of a base, a work-holding turret comprising two chucks mounted on the base for movement about an approximately vertical axis whereby one chuck may be placed in the tooling position and the other chuck in the work-chucking position, the axis of the chuck in the work-chucking position being slightly inclined to the horizontal, a tool support also mounted on the base, a boring bar mounted in the tool support coaxially of the chuck in the tooling position, means extending across the tops of the turret and tool support and rigidly connecting such members, and means for causing relative rotating and feeding movements between the bar and last mentioned chuck.

8. In a boring machine, the combination of a base, a work-holding turret comprising two chucks mounted on the base for movement about an approximately vertical axis whereby one chuck may be placed in the tooling position and the other chuck in the work-chucking position, the axis of the chuck in the work-chucking position being slightly inclined to the horizontal and the axis of the chuck in the tooling position being substantially horizontal, a tool support also mounted on the base, a boring bar mounted in the tool support coaxially of the chuck in the tooling position, and means for causing relative rotating and feeding movements between the bar and last mentioned chuck.

9. In a boring machine, the combination of a base, a work-holding turret comprising two chucks mounted on the base for swivelling movement about an axis slightly inclined to the vertical whereby one chuck may be placed in the tooling position with its axis substantially horizontal and the other chuck in the work-chucking position with its axis slightly inclined to the horizontal, a tool support also mounted on the base, a boring bar mounted in the tool support coaxially of the chuck in the tooling position, and means for causing relative rotating and feeding movements between the bar and last mentioned chuck.

10. In a boring machine, the combination of a base, a work-holding turret comprising two chucks mounted on the base for swivelling movement about an axis slightly inclined to the vertical whereby one chuck may be placed in the tooling position and the other chuck in the work-chucking position, a tool support also mounted on the base, a boring bar mounted in the tool support coaxially of the chuck in the tooling position, a rail extending across the tops of the turret and tool support and rigidly connecting such members, a crane mounted on the rail above the turret, and means for causing relative rotating and feeding movements between the tool and last mentioned chuck.

11. In a boring machine, the combination of a base, a work-holding turret comprising two chucks mounted on the base for swivelling movement about an axis slightly inclined to the vertical whereby one chuck may be placed in the tooling position and the other chuck in the work-chucking position with its axis slightly inclined to the horizontal, a tool support also mounted on the base, a boring bar mounted in the tool support coaxially of the chuck in the tooling position, a rail extending across the tops of the turret and tool support and rigidly connecting such members, and means for causing relative rotating and feeding movements between the bar and last mentioned chuck.

12. In a boring machine, the combination of a base, a work-holding turret comprising two chucks mounted on the base for movement about an approximately vertical axis whereby either chuck may be placed in the tooling position and the other chuck in the work-chucking position, a tool support also mounted on the base, means rigidly connecting the turret and tool support, a boring bar mounted in the tool support coaxially of the chuck in the tooling position, means for securing the turret in the working position, and means for causing relative rotating and feeding movements between the bar and last mentioned chuck.

13. In a boring machine, the combination of a base, a work-holding turret comprising two chucks mounted on the base for movement about an approximately vertical axis whereby either chuck may be placed in the tooling position and the other chuck in the work-chucking position, a tool support also mounted on the base, means rigidly connecting the turret and tool support, a boring bar mounted in the tool support coaxially of the chuck in the tooling position, means for centering and securing the turret in the working position, and means for causing relative rotating and feeding movements between the bar and last mentioned chuck.

14. In a boring machine, the combination of a base, a work-holding turret comprising two chucks mounted on the base for movement about an approximately vertical axis whereby either chuck may be placed in the tooling position and the other chuck in the work-chucking position, a tool support also mounted on the base, means rigidly connecting the turret and tool support, a boring bar mounted in the tool support coaxially of the chuck in the tooling position, fluid pressure means for centering and securing the turret in the working position, and means for causing relative rotating and feeding movements between the bar and last mentioned chuck.

15. In a boring machine, the combination of a base, a work-holding turret comprising two chucks mounted on the base for movement about an approximately vertical axis whereby either chuck may be placed in the tooling position and the other chuck in the work-chucking position, a tool support also mounted on the base, means rigidly connecting the turret and tool support, a boring bar mounted in the tool support coaxially of the chuck in the tooling position, wedge means for securing the turret in the working position, and means for causing relative rotating and feeding movements between the bar and last mentioned chuck.

16. In a boring machine, the combination of a base, a work-holding turret comprising two chucks mounted on the base for movement about an approximately vertical axis whereby either chuck may be placed in the tooling position and the other chuck in the work-chucking position, a tool support also mounted on the base, means rigidly connecting the turret and tool support, a boring bar mounted in the tool support coaxially of the chuck in the tooling position, wedge means for securing the turret in the working position, fluid pressure means for operating the wedge means, and means for causing relative rotating and feeding movements between the bar and last mentioned chuck.

17. In a boring machine, the combination of a base, a work-holding turret comprising two chucks mounted on the base for movement about an approximately vertical axis whereby either chuck may be placed in the tooling position and the other chuck in the work-chucking position, a tool support also mounted on the base, means rigidly connecting the turret and tool support, a boring bar mounted in the tool support coaxially of the chuck in the tooling position, a wedge carried by the turret and tapered in two directions for centering and securing the turret in the working position, fluid pressure means for operating the wedge, and means for causing relative rotating and feeding movements between the bar and last mentioned chuck.

18. In a boring machine, the combination of a base, a work-holding turret comprising two chucks mounted on the base for movement about an approximately vertical axis whereby either chuck may be placed in the tooling position and the other chuck in the work-chucking position, a tool support also mounted on the base, means rigidly connecting the turret and tool support, a boring bar mounted in the tool support coaxially of the chuck in the tooling position, a wedge carried by the turret and adapted to engage the base to secure the turret in the working position, a cylinder and piston carried by the turret for operating the wedge, and means for causing relative rotating and feeding movements between the bar and last mentioned chuck.

19. In a boring machine, the combination of a base, a work-holding turret comprising two chucks mounted on the base for movement about an approximately vertical axis whereby either chuck may be placed in the tooling position and the other chuck in the work-chucking position, clamping jaws on the chucks, a tool support also mounted on the base, means rigidly connecting the turret and tool support, a boring bar mounted in the tool support coaxially of the chuck in the tooling position, fluid pressure means for operating the clamping jaws, fluid pressure means for securing the turret in the working position, and means for causing relative rotating and feeding movements between the bar and last mentioned chuck.

20. In a boring machine, the combination of a base, a work-holding turret comprising two chucks mounted on the base for movement about an approximately vertical axis whereby either chuck may be placed in the tooling position and the other chuck in the work-chucking position, clamping jaws on the chucks, a tool support also mounted on the base, means rigidly connecting the turret and tool support, a boring bar mounted in the tool support coaxially of the chuck in the tooling position, wedge means for securing the turret in the working position, fluid pressure means for operating the wedge means, fluid pressure means for operating the clamping jaws, and means for causing relative rotating and feeding movements between the bar and last mentioned chuck.

21. A work holder comprising a chuck, radially movable work-engaging jaws mounted on the chuck, and an axially slidable centering and supporting member at the center of the chuck for supporting one end of a boring bar during the boring operation.

22. A turret work holder comprising a plurality of chucks, radially movable work-engaging jaws mounted on each chuck, and an axially slidable centering and supporting member at the center of each chuck for supporting one end of a boring bar during the boring operation.

23. A turret work holder comprising two coaxial chucks, radially movable work-engaging jaws mounted on each chuck, and a centering and supporting member coaxial with the chucks and having means at each end for engaging and supporting the free end of a boring bar during the boring operation, the member being adapted to slide axially of the chucks whereby to place either end thereof in a bar-supporting position adjacent the outer face of its respective chuck.

24. A turret work holder comprising two coaxial chucks, radially movable work-engaging jaws mounted on each chuck, a centering and supporting member coaxial with the chucks and having means at each end for engaging and supporting the free end of a boring bar during the boring operation, the member being adapted to slide axially of the chucks whereby to place either end thereof in a bar-supporting position adjacent the outer face of its respective chuck, and means for normally holding the centering member in position at one or the other end of its sliding movement.

25. A turret work holder comprising two coaxial chucks, radially movable work-engaging jaws mounted on each chuck, a centering and supporting member coaxial with the chucks and having means at each end for engaging and supporting the free end of a boring bar during the boring operation, the member being shorter than the distance between the outer faces of the two chucks and being adapted to slide axially of the chucks whereby to place either end thereon in a bar-supporting position adjacent the outer face of its respective chuck, and stop means for limiting the sliding movement of the centering member in either direction.

26. In a boring machine, the combination of a base, a work holder thereon comprising a chuck, a tool support also mounted on the base, a boring bar mounted in the tool support coaxially of the chuck, spaced roughing and finishing cutters on the bar, a boring bar centering and supporting member mounted in the work holder for sliding movement coaxially of the bar and chuck, the said member being adapted to be engaged by the free end of the boring bar just prior to the beginning of the operation of the finishing cutter and to support the bar and travel with and coaxially of the feeding movement of the bar, and means for causing relative rotating and feeding movements between the bar and chuck.

27. In a boring machine, the combination of a base, a turret work holder mounted on the base and comprising two coaxial chucks, a tool support also mounted on the base, a boring bar mounted in the tool support coaxially of the chucks, a boring bar centering and supporting member mounted in the work holder for sliding movement coaxially of the bar and chucks, the said member being adapted to engage and support the free end of the boring bar during the boring operation and to travel with and coaxially of the feeding movement of the bar, such feeding movement when operating on work in either chuck being adapted to move the centering and supporting member to a position adjacent and ready for operation in the other chuck, means for normally holding such member in such position while the boring bar is being withdrawn, and means for causing relative rotating and feeding movements between the bar and chucks.

28. In a boring machine, the combination of a base, a work holder thereon, a boring bar, operating means for the boring bar comprising a cylinder and piston, one of such members being operatively connected to the bar and the other being secured to the base, two fluid pressure pipes, fluid pressure conduits connecting the pipes to the opposite sides of the piston respectively, valves in the pipes for controlling the flow of fluid to the opposite sides of the piston, means connecting such valves and adapted in one position to leave a restricted opening through one valve whereby the flow of fluid is regulated to slowly feed the boring bar forward and in another position to leave a full opening through such valve whereby the flow of fluid in the opposite direction may be rapid to permit the rapid withdrawal of the bar, and means for rotating the bar.

29. In a boring machine, the combination of a base, a work holder thereon, a boring bar, operating means for the boring bar comprising a cylinder and piston, one of such members being operatively connected to the bar and the other being secured to the base, a reservoir adapted to contain a liquid, a conduit leading from the bottom of the reservoir into the cylinder at one side of the piston, an air conduit leading into the top of the reservoir and into the cylinder at the other side of the piston, a controlling valve in each of the conduits, common means for operating the valves whereby in one position of the said means the air conduit leads into the cylinder at one side of the piston and a restricted opening in the valve of the other conduit leads into the reservoir and in the other position of the said means the air conduit leads into the reservoir and the valve in the other conduit is fully opened into the reservoir, and means for rotating the bar.

30. In a boring machine, the combination of a base, a work holder thereon, a boring bar, a fluid pressure cylinder operatively connected to the bar, a piston operative within the cylinder, a piston rod connecting the piston to the base, two fluid pressure pipes, fluid pressure conduits through the piston rod connecting the pipes to the opposite sides of the piston respectively, valves in the pipes for controlling the flow of fluid to the opposite sides of the piston, means connecting such valves and adapted in one position to leave a restricted opening through one valve whereby the flow of fluid is regulated to slowly feed the boring bar forward and in another position to leave a full opening through such valve whereby the flow of fluid in the opposite direction may be rapid to permit the rapid withdrawal of the bar, and means for rotating the bar.

31. In a boring machine, the combination of a base, a work holder thereon, a boring bar, a fluid pressure cylinder operatively connected to the bar, a piston operative within the cylinder, a piston rod connecting the piston to the base, a reservoir adapted to contain a liquid, a conduit leading from the bottom of the reservoir through the piston rod into the cylinder at one side of the piston, an air conduit leading into the top of the reservoir and through the piston rod into the cylinder at the other side of the piston, a controlling valve in each of the conduits, common means for operating the valves whereby in one position of the said means the air conduit leads into the cylinder at one side of the piston and a restricted opening in the valve of the other conduit leads into the reservoir and in the other position of the said means the air conduit leads into the reservoir and the valve in the other conduit is fully opened into the reservoir, and means for rotating the bar.

32. In a boring machine, the combination with a work holder, of a boring bar, fluid pressure means comprising a cylinder and piston for slowly feeding the bar forward and for rapidly withdrawing the bar, valve means for controlling the operation of the piston, a facing tool mounted for sliding feeding movement parallel with the movement of the bar, means for feeding the facing tool, and means for rotating the facing tool and the bar.

33. In a boring machine, the combination with a work holder, of a boring bar, fluid pressure means comprising a cylinder and piston for slowly feeding the bar forward and for rapidly withdrawing the bar, valve means for controlling the operation of the piston, a facing tool mounted for sliding feeding movement parallel with the movement of the bar, hand means for feeding the facing tool, and means for rotating the facing tool and the bar.

34. In a boring machine, the combination with a work holder, of a rotary tool support, a boring bar mounted for sliding movement within the tool support, fluid pressure means comprising a cylinder and piston for slowly feeding the bar forward and for rapidly withdrawing the bar, valve means for controlling the operation of the piston, a facing tool slidably mounted on the tool support for sliding feeding movement parallel with the movement of the bar, means for feeding the facing tool, and means for rotating the tool support, facing tool and bar.

35. In a boring machine, the combination of a work support having an opening therein, and a boring bar centering and supporting member slidably mounted in the opening, the said member being adapted to be engaged by the end of a boring bar and to slide axially of and with the bar in the said opening during a boring operation.

36. In a boring machine, the combination of a work support having an opening therein, a boring bar centering and supporting member mounted in the opening, a boring bar adjacent and coaxial of the said opening, the said member being provided with an opening therein of a shape corresponding to the shape of the free end of the boring bar, and a roughing tool and a finishing tool on and adjacent the free end of the bar, the roughing tool being adapted to first operate on the work and the said opening in the member being adapted to receive the said free end of the boring bar therein to center and support the bar during the operation of the finishing tool.

37. In a boring machine, the combination of a work support having an opening therein, a boring bar centering and supporting member slidably mounted in the opening, a boring bar adjacent and coaxial of the said opening, and a roughing tool and a finishing tool on and adjacent the free end of the bar, the roughing tool being adapted to first operate on the work and the boring bar being adapted to be engaged with and supported by the said member during the operation of the finishing tool, the said member sliding along with and axially of the bar in the opening during the finishing operation.

38. In a boring machine, the combination of a work support having an opening therein, a boring bar centering and supporting member slidably mounted in the opening, a boring bar adjacent and coaxial of the said opening, the said member being provided with an opening therein of a shape corresponding to the shape of the free end of the boring bar, and a roughing tool and a finishing tool on and adjacent the free end of the bar, the roughing tool being adapted to first operate on the work and the end of the boring bar thereafter being adapted to engage in the opening of the said member whereby to center and support the bar during the finishing operation, the member sliding along with and axially of the bar in the first said opening during the finishing operation.

In testimony whereof, I hereto affix my signature.

WILLARD T. SEARS.